US012633050B2

(12) United States Patent
Shu et al.

(10) Patent No.: US 12,633,050 B2
(45) Date of Patent: *May 19, 2026

(54) ANNOTATION TOOLS FOR RECONSTRUCTING MULTI-FLOOR BUILDINGS

(71) Applicant: ECOPIA TECH CORPORATION, Toronto (CA)

(72) Inventors: Yuanming Shu, Toronto (CA); Shuo Tan, Campbell, CA (US); Dawei Zai, Toronto (CA); Tuan Zhao, Toronto (CA)

(73) Assignee: ECOPIA TECH CORPORATION, Toronto (CA)

( * ) Notice: Subject to any disclaimer, the term of this patent is extended or adjusted under 35 U.S.C. 154(b) by 8 days.

This patent is subject to a terminal disclaimer.

(21) Appl. No.: 18/431,318

(22) Filed: Feb. 2, 2024

(65) Prior Publication Data

US 2025/0037364 A1     Jan. 30, 2025

Related U.S. Application Data

(60) Provisional application No. 63/595,865, filed on Nov. 3, 2023, provisional application No. 63/515,665, filed on Jul. 26, 2023.

(51) Int. Cl.
*G06T 17/05*          (2011.01)
*G06T 7/13*           (2017.01)
(Continued)

(52) U.S. Cl.
CPC ................ *G06T 17/00* (2013.01); *G06T 7/13* (2017.01); *G06T 17/05* (2013.01); *G06V 20/70* (2022.01); *H04N 13/351* (2018.05)

(58) Field of Classification Search
CPC ................................ G06T 17/05; G06F 30/13
See application file for complete search history.

(56) References Cited

U.S. PATENT DOCUMENTS

| | | | |
|---|---|---|---|
| 9,599,466 B2 | 3/2017 | Pershing et al. | |
| 11,030,355 B2 | 6/2021 | Pershing | |

(Continued)

FOREIGN PATENT DOCUMENTS

KR          101465479 B1     11/2014

OTHER PUBLICATIONS

Robichaud, Dan. "Using Sketchup to make 3D buildings in Google Earth." YouTube, Feb. 10, 2012, https://youtu.be/FbHjlfgthYc?si= jCvUjpXSWBV-eCDy. New screenshots provided. (Year: 2012).*

(Continued)

*Primary Examiner* — Ryan Mcculley
(74) *Attorney, Agent, or Firm* — Damian Rolfe

(57)          ABSTRACT

Methods and systems for generating geometric models of buildings from multiview imagery are provided. An example method involves displaying at least a first image and a second image that depict the building from different points of view, providing functionality for a user to annotate, with reference to at least the first image and the second image, a three-dimensional structure of a first building section of the building having a polygonal outline of a first substantially horizontal roof structure situated at a first height, and a three-dimensional structure of a second building section of the building having a polygonal outline of a second substantially horizontal roof structure situated at a second height lower than the first height. The polygonal outline of the second substantially horizontal roof structure is annotated by selecting a point located directly on one of the side walls of the first building section.

18 Claims, 11 Drawing Sheets

(51) Int. Cl.

| | |
|---|---|
| *G06T 17/00* | (2006.01) |
| *G06V 20/70* | (2022.01) |
| *H04N 13/351* | (2018.01) |

(56) References Cited

U.S. PATENT DOCUMENTS

| | | | |
|---|---|---|---|
| 2011/0205245 | A1 | 8/2011 | Kennedy et al. |
| 2013/0132041 | A1* | 5/2013 | Sigaty .................. G06Q 50/165 |
| | | | 703/1 |
| 2014/0200861 | A1 | 7/2014 | DeVito et al. |
| 2014/0320488 | A1* | 10/2014 | Ege ......................... G06T 19/20 |
| | | | 345/420 |
| 2015/0199104 | A1* | 7/2015 | Gontowski ............ G06Q 30/08 |
| | | | 715/771 |
| 2019/0088032 | A1* | 3/2019 | Milbert ............... G06F 3/04815 |
| 2019/0138666 | A1 | 5/2019 | Pershing |
| 2019/0188337 | A1 | 6/2019 | Keane |
| 2020/0355496 | A1* | 11/2020 | Pershing ................ G01B 21/28 |
| 2022/0318936 | A1 | 10/2022 | Copley |

OTHER PUBLICATIONS

Cybercity, Kilian Ulm, Improved 3d City Modeling With Cybercity-Modeler (Cc-Modeler TM) Using Aerial-, Satellite Imagery And Laserscanner Data, International Archives of the Photogrammetry, Remote Sensing and Spatial Information Sciences, vol. XXXIV-5/W10, 2003.

Eberhard Gulch, Hardo Muller, Thomas Labe, Integration Of Automatic Processes Into Semi-Automatic Building Extraction, Institute of Photogrammetry, University Bonn, Germany, 1999.

PCT/IB2024/052274, International Search Report, May 27, 2024.

PCT/IB2024/052274, Written Opinion of the International Searching Authority, May 27, 2024.

Office Action to U.S. Appl. No. 19/176,915 dated Jun. 6, 2025.

Office Action to U.S. Appl. No. 19/176,915 dated Jul. 15, 2025.

Office Action to U.S. Appl. No. 19/176,915 dated Oct. 16, 2025.

Office Action issued by the USPTO in co-pending U.S. Appl. No. 19/176,915, dated Mar. 9, 2026.

* cited by examiner

Roof Perimeter 608

Extruded Base 610

Extrusion Tool

Adjusted Roof Perimeter 624

Roof Perimeter 622

Roof Perimeter Repair Tool

Square Angles 606

Rectangle Tool

Building Section 618

Building Section 620

Tracing Guide 614

Trace Adjustment Tool

Reference Line 604

Parallel Line 602

Parallel Line Tool

Building Section 616

Building Section 612

Tracing Guide 614

Tracing Tool

ANNOTATION TOOLS FOR RECONSTRUCTING MULTI-FLOOR BUILDINGS

CROSS-REFERENCE TO RELATED APPLICATIONS

The present application claims priority to U.S. Provisional Patent Application No. 63/515,665, filed Jul. 26, 2023, entitled ANNOTATION TOOLS FOR RECONSTRUCTING MULTI-FLOOR BUILDINGS, and to U.S. Provisional Patent Application No. 63/595,865, filed Nov. 3, 2023, entitled ANNOTATION TOOLS FOR RECONSTRUCTING MULTI-FLOOR BUILDINGS, each of which are incorporated herein by reference in their entireties.

BACKGROUND

Geometric models can be used to mathematically represent virtual and real-world structures and objects. Geometric models are used in a wide range of applications, including as building models in geographic information systems, in software development and game design, including for augmented reality and virtual reality applications, and other applications.

Geometric models of real-world structures can be derived from real-world imagery. For example, a three-dimensional model of a building may be reconstructed from multiview imagery of the building annotated with the major features of the building. The reconstructed geometric model can be represented as vector data comprising a set of geometric entities (e.g., polygons, lines, points) and constraints that model the geometric features of the building.

DETAILED DESCRIPTION

The present disclosure describes various aspects of an annotation platform and associated image processing engine. The annotation platform provides features that may be particularly useful for reconstructing geometric models of buildings, and in particular "multi-floor" buildings. In this disclosure, the term "multi-floor" building may be understood to refer to a building with multiple sections with substantially flat roof areas that may or may not completely overlap one another. Geometrically, each building can therefore be modeled by one or more polygonal prisms.

The annotation platform and its tools described herein may be used to generate geometric models of buildings directly from source imagery. Alternatively, the annotation platform and tools may be used to edit previously-generated geometric models of buildings for quality assurance purposes. The resulting geometric models may be suitable for use in Geospatial Information Systems (GIS), Computer-Aided Design (CAD), for augmented reality and virtual reality applications, among other applications.

Figure 1:
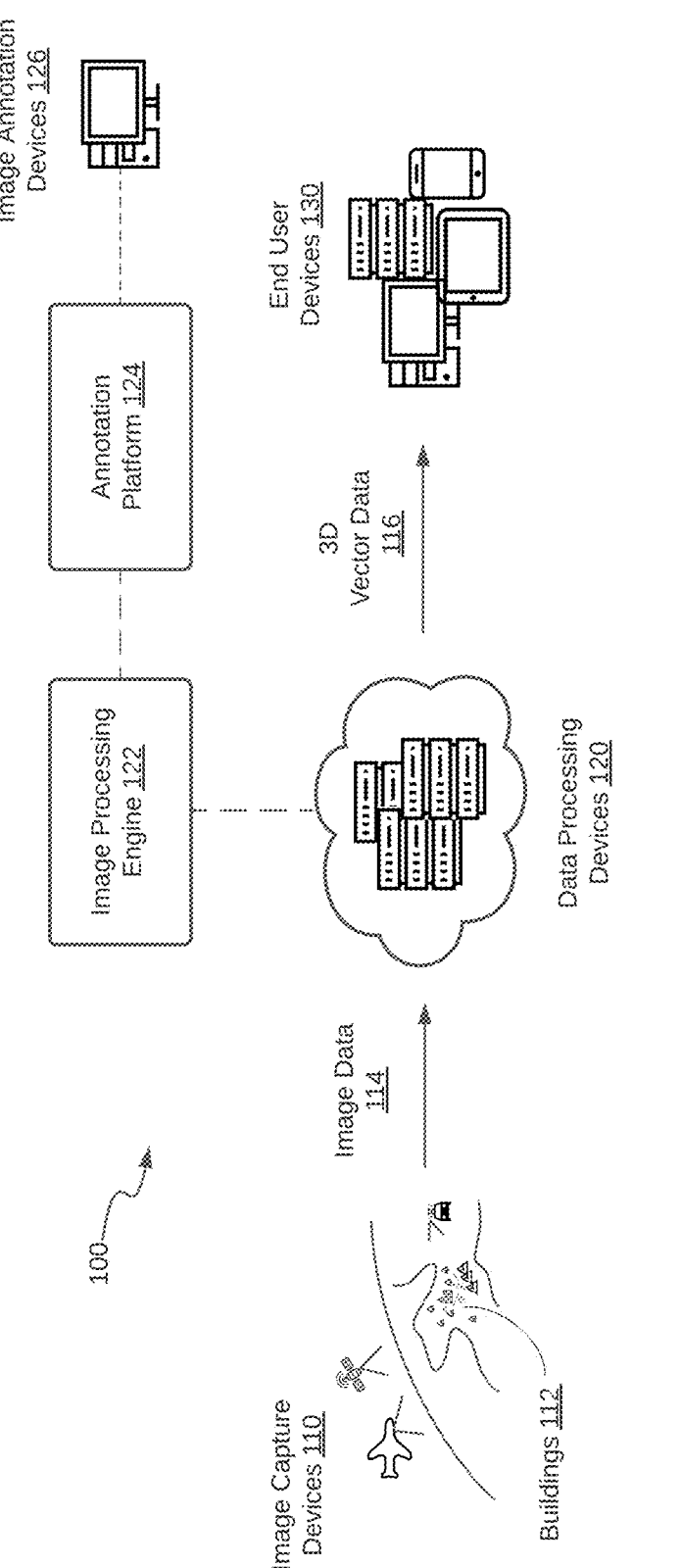
FIG. 1 is a schematic diagram of an example system for reconstructing three-dimensional building geometry.

FIG. 1 is a schematic diagram of an example system 100 for reconstructing three-dimensional roof geometry. The system 100 includes one or more image capture devices 110 to capture image data 114 of an area of interest containing one or more buildings 112. An image capture device 110 may include any suitable sensor (e.g., camera) onboard an aircraft, satellite, drone, or other device capable of capturing imagery of an area of interest from a generally overhead point of view (i.e., geospatial imagery). An image capture device 110 may also include any suitable sensor onboard a motor vehicle (e.g., street view car), unmanned aerial vehicle (e.g., drone), personal device (e.g., smart phone), that is capable of capturing imagery of a building or other structure of interest from a more oblique perspective at a ground or near-ground level.

The image data 114 comprises the raw image data captured by such image capture devices 110 along with any relevant metadata, including camera parameters (e.g., focal length, lens distortion, camera pose, resolution), geospatial position information (e.g., latitude and longitude position), or other relevant metadata that may be provided. Depending on the types of image capture devices 110 involved, the imagery will generally include a set of oblique images depicting a building 112 from several different perspectives. However, in principle, any type of imagery depicting a building 112 from different perspectives may be used (including, e.g., a stereoscopic pair). The image data 114 may contain several batches of imagery covering the same area, from different points of view, which may have been captured on the same dates, or on different dates.

The system 100 further includes one or more data processing devices 120 to process the image data 114 to produce 3D vector data 116 as described herein. The data processing devices 120 include one or more computing devices, such as virtual machines or servers in a cloud computing environment comprising one or more processors for executing computing instructions. In addition to processing capabilities, the data processing devices 120 include one or more communication interfaces to receive/obtain/access the image data 114 and to output/transmit 3D vector data 116 through one or more computing networks and/or telecommunications networks such as the internet. Such computing devices further include memory (i.e., non-transitory machine-readable storage media) to store programming instructions that embody the functionality described herein.

The data processing devices 120 are configured to run (i.e., store, host or access) an image processing engine 122. The image processing engine 122 cooperates with an annotation platform 124 as described herein. The image processing engine 122 and the annotation platform 124 are represented here as separate functional units that each may comprise one or more programs, software modules, or other set of non-transitory machine-readable instructions, to carry out the functionality described herein. However, this arrangement is shown for illustrative purposes only, and it is to be understood that any of the functionality described herein may be performed by any combination of programs, software modules, or other sets of non-transitory machine-readable instructions.

The annotation platform 124 may be hosted by the data processing devices 120 in a manner accessible by image annotation devices 126 (e.g., through the internet), or directly executable on image annotation devices 126. In any case, the image annotation devices 126 may include one or more computing devices configured to run (i.e., store, host or access) the annotation platform 124. The image annotation devices 126 therefore may include one or more user input devices (e.g., keyboard, mouse, touchscreen) to receive user input into the annotation platform 124 and a display device to allow a user to view a user interface provided by the annotation platform 124.

The 3D vector data 116 may be generally understood to include any form of three-dimensional vector data representations of a building's structure as generated through the annotation platform 124. In particular, the 3D vector data 116 may include a geometric representation of the three-dimensional structure of a building with multiple roof sections at different heights as described herein (e.g., the geometric model 208 of FIG. 2). The creation of the 3D vector data 116 through the use of the annotation platform 124 and the image processing engine 122 are described in detail later in this disclosure. Following the generation of the 3D vector data 116, the data processing devices 120 may provide such 3D vector data 116 to one or more end user devices 130. An end user device 130 may include one or more computing devices configured to run (i.e., store, host or access) one or more software programs to display, process, or otherwise use the 3D vector data 116 (e.g., a GIS viewer, CAD software). In some examples, an end user device 130 may include a display device and user interface and may allow a user to view and manipulate the 3D vector data 116. The end user devices 130 may use the 3D vector data 116 for any suitable application, such as to display models of the buildings 112 through a viewer, or for other purposes.

Figure 2:
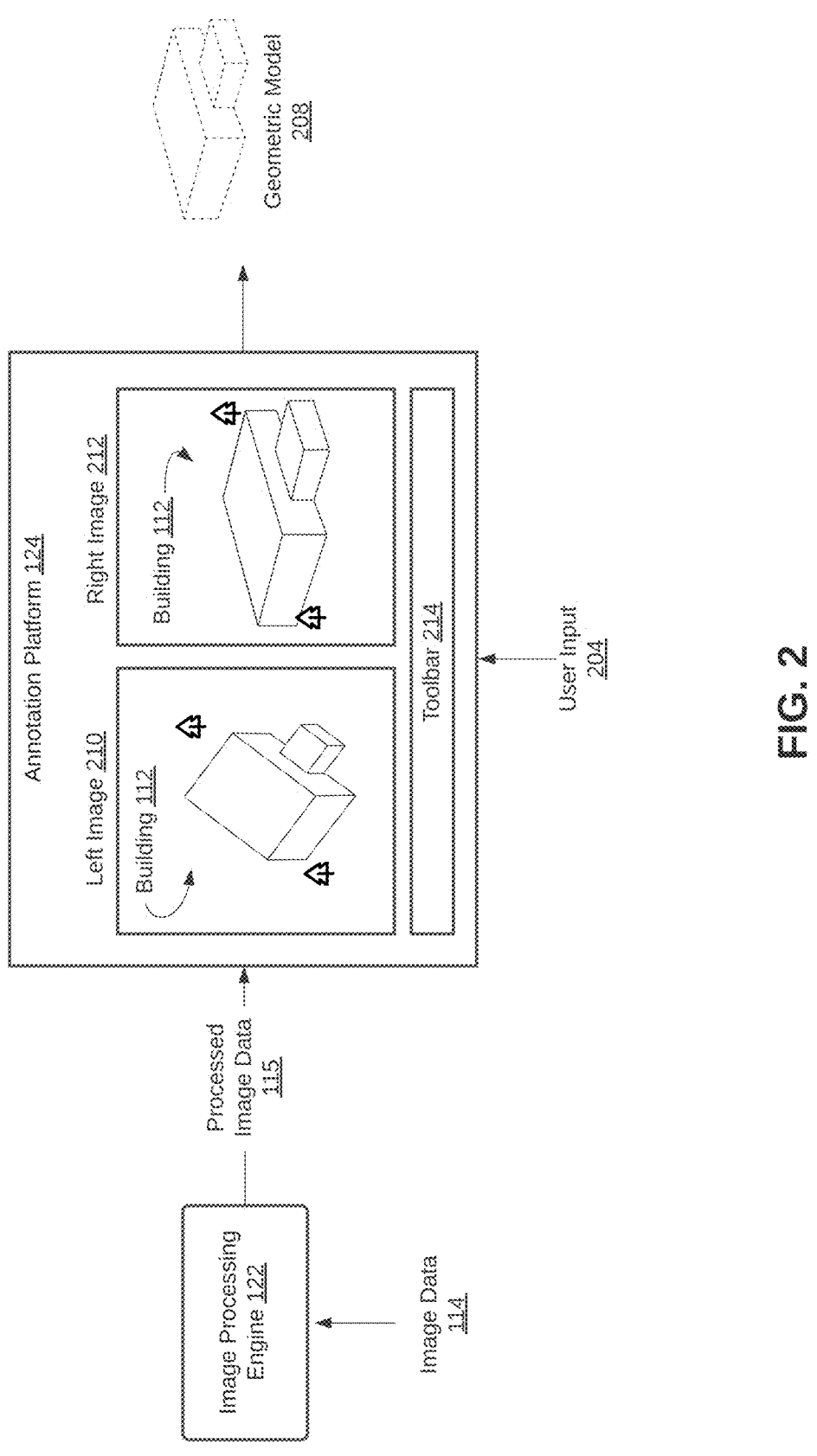
FIG. 2 is a schematic diagram of an example annotation platform for reconstructing three-dimensional building geometry in cooperation with an image processing engine.

FIG. 2 is a schematic diagram showing the annotation platform 124 in cooperation with the image processing engine 122 in greater detail. The image processing engine 122 receives image data 114, which includes multiview imagery depicting at least one building 112, depicted here as a "multi-floor" building comprising multiple roof sections at different heights. Based on the image data 114, the image processing engine 122 determines the relative camera pose of each of the cameras involved in capturing the multiview imagery and establishes a three-dimensional coordinate space in which the geometric model 208 of the building 112 will be situated. This process may involve various feature matching and camera calibration techniques (e.g., bundle adjustment). This process may also involve selecting a subset of multiview imagery that is appropriate for use in the annotation process (e.g., based on image quality, angle of inclination, or other factors).

The image processing engine 122 thereby processes the image data 114 to produce processed image data 115 which contains such camera parameters and the multiview imagery to be used for the annotation process. The image processing engine 122 provides processed image data 115 to the annotation platform 124. The multiview imagery includes at least a first image (e.g., left image 210) and a second image (e.g., right image 212) which depict the pitched roof of the building 112 from different points of view.

The annotation platform 124 displays a user interface that contains a viewport for the left image 210 and a viewport for the right image 212. In some examples, the two images are displayed simultaneously and side-by-side for ease of viewing. However, in other examples, the two images may be displayed asynchronously (e.g., one after the other at different stages of an annotation process through a single viewport). In addition to the two images depicted here (the left image 210 and right image 212), the annotation platform 124 may have access to additional images captured from additional perspectives that may also be used in the annotation process, and may make these additional images available for annotation either simultaneously or in sequence with the other images, for example, by replacing the image in either viewport and making any annotations as appropriate.

The annotation platform 124 receives user input 204 that comprises instructions for annotating the imagery with the three-dimensional structure of the building 112. For example, as described in later detail later in the disclosure, the user input 204 may include instructions that define the various roof sections of the building 112 and instructions that extrude the roof sections downward toward the ground level, thereby defining the roof, the side walls, and the footprint of the building 112. Using the determined camera parameters, annotations that are made over each image can be projected into the three-dimensional coordinate space. These annotations are made over multiview imagery captured from different perspectives thereby allowing a user to define the features in three-dimensional space.

A user may access a suite of annotation tools to make such annotations, some of which will be described later in this disclosure. For illustrative purposes, the annotation platform 124 is depicted as providing a toolbar 214 from which some of these annotation tools may be accessed. However, this toolbar 214 is shown for illustration purposes only, and it is to be understood that some annotation tools may be accessed by a user inputting the requisite keyboard and/or mouse strokes and a user is not necessarily limited to accessing annotation tools through the toolbar 214.

The annotation platform 124 may internally process certain annotation data that reflects the annotations made by a user through user input 204. Generally, the annotation data will include a set of vector data representing the set of points and/or other geometric elements and constraints that define the various roof elements annotated by the user (e.g., a set of points and/or lines and/or polygons). In other examples, the annotation data may represent the annotation operations performed by the user (e.g., draw line operation). In either case, the annotation data can be interpreted as instructions for reconstructing the roof geometry as a geometric model 208. Given the annotation data and the relevant camera parameters, the annotation platform 124 generates the geometric model 208 of the building 112 as situated in a three-dimensional coordinate space.

FIGS. 3A-3F depict the annotation platform 124 at various stages of an annotation procedure that may be followed to annotate a multi-floor building. The steps of the annotation procedure are set out in a method 400 depicted in the flowchart of FIG. 4.

Figure 3A:
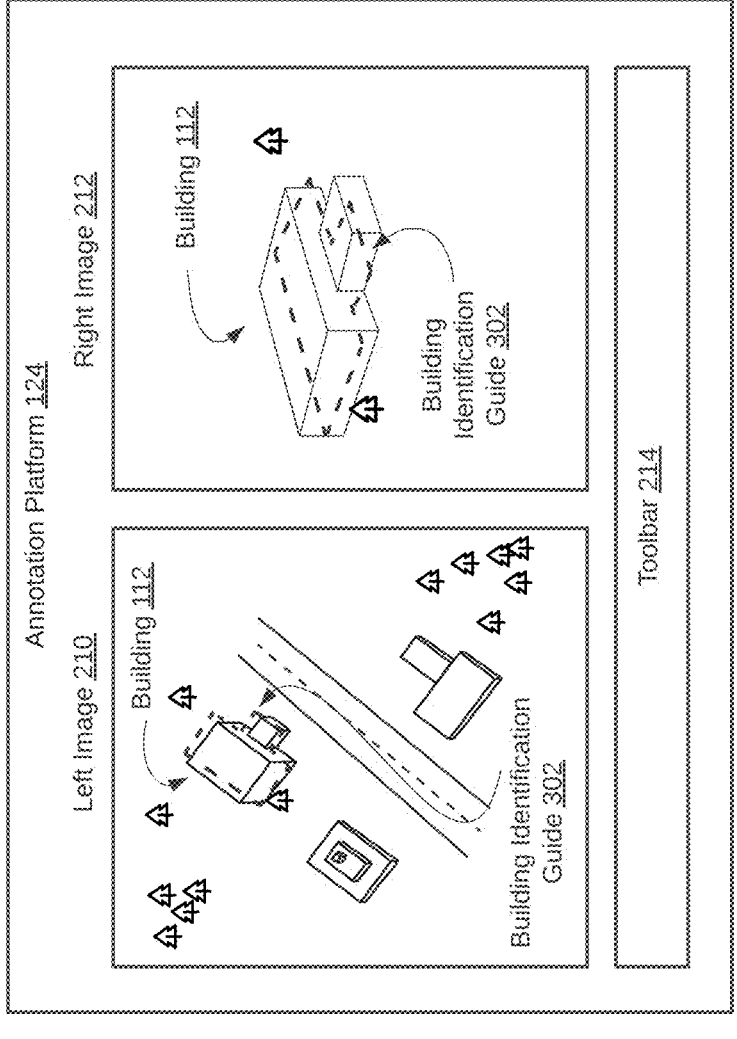
FIGS. 3A-3F are schematic diagrams showing an example annotation platform for reconstructing three-dimensional building geometry in various stages of operation.
Figure 4:
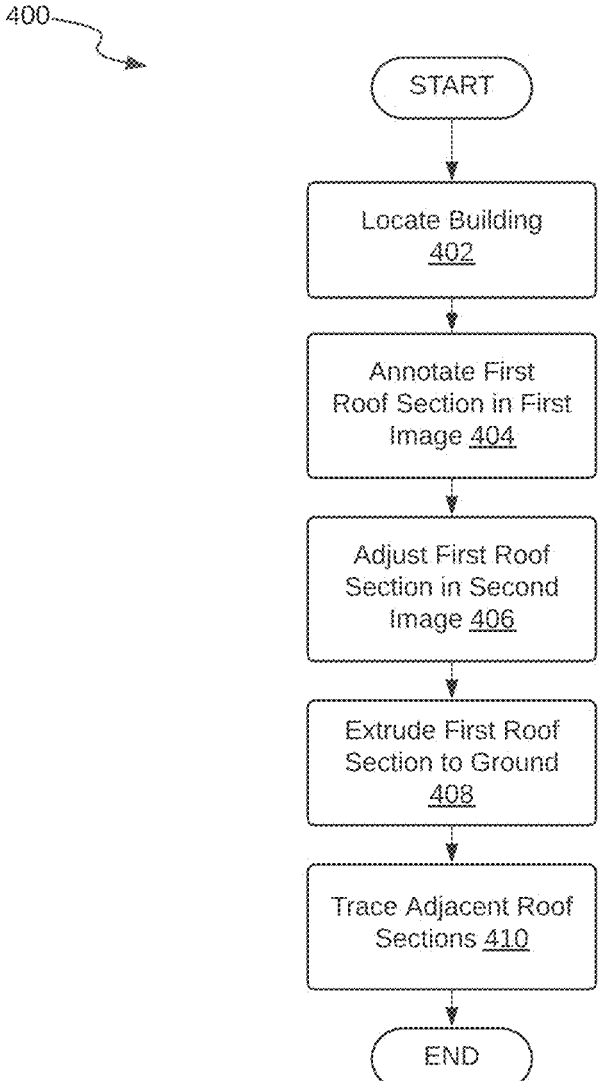
FIG. 4 is a flowchart of an example method for annotating multiview imagery of a building with the major structural features of the building.

First, referring to FIG. 3A and step 402 of FIG. 4, the annotation platform 124 may display a building identification guide 302 to assist the user to locate the correct building to be annotated. The building identification guide 302 may allow the user to identify the target building 112 in an image that may depict several other buildings.

The building identification guide 302 should be georeferenced to the three-dimensional coordinate space being used, allowing it to be properly placed in at least one of the images made available by the annotation platform 124.

Further, the building identification guide 302 may comprise data that uniquely represents the target building 112. In the present example, the building identification guide 302 comprises a building footprint polygon (or rooftop polygon) representing the building 112 in two dimensions (i.e., without height information). As shown in FIG. 3A, the building footprint polygon is georeferenced to the three-dimensional coordinate space and can thereby be projected into both the left image 210 and the right image 212. This building footprint polygon may be "preliminary" in that it is intended to be replaced by the three-dimensional building data that is to be generated according to the annotation and 3D reconstruction process described herein. Since the preliminary building footprint polygon resembles at least the general two-dimensional outline of the building 112, it assists the user to easily identify and distinguish the correct building 112 among other buildings that may be depicted in the same imagery. Without any height data, the preliminary building footprint polygon should be projected into the three-dimensional coordinate space at some initial guess as to the correct height. The building footprint polygon may be projected at an initial guess for the height of the building (i.e., to situate the polygon at the roof of the building), or at an initial guess for the ground level elevation at the base of the building. An initial guess for building height can be obtained from a reference data source such as a digital surface map. An initial guess for the ground level elevation of the building can be obtained from a reference data source such as a digital terrain map. One of these reference data sources may have been generated by an earlier process (e.g., by the image processing engine 122).

A building footprint polygon to be used as the building identification guide 302 may be extracted from single imagery (i.e., without the need for multiview imagery). The single imagery may include images made available through the annotation platform 124 or other imagery. As for the means of extraction, such a building footprint polygon may have been extracted from an image using the machine learning process described in U.S. patent application Ser. No. 17/731,769, entitled MACHINE LEARNING FOR VECTOR MAP GENERATION, filed Apr. 28, 2022, the entirety of which is hereby incorporated by reference.

Regardless of the data type used, the building identification guide 302 may be depicted and/or styled in a manner that visually distinguishes it from any annotation features that may be made over the imagery (e.g., in a different color, in dashed lines, or otherwise made visually distinct from any annotations). The building identification guide 302 may be stored in a separate data layer that may be disabled when not in use (e.g., after the correct building 112 has been identified).

Figure 3B:
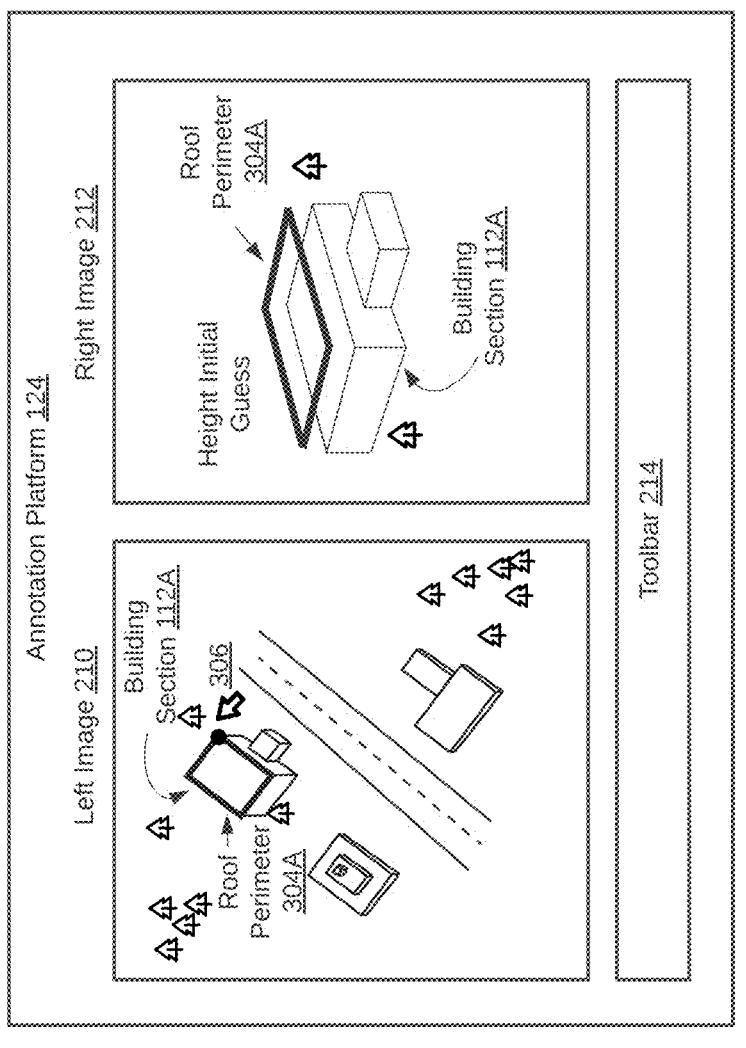

Next, referring to FIG. 3B and step 404 of FIG. 4, the annotation platform 124 provides functionality for a user to annotate the perimeter of the roof of the building 112, indicated as first roof perimeter 304A. The user may engage a "draw roof perimeter tool" (e.g., by selecting the tool from the toolbar 214 or by executing the appropriate keyboard inputs) and proceed to annotate the first roof perimeter 304A as depicted in one of the images made available by the annotation platform 124. As shown in FIG. 3B, the user uses the cursor 306 to outline the roof of the building 112 in the rectangular shape depicted in the left image 210, resulting in the first roof perimeter 304A. As the user annotates the first roof perimeter 304A in the left image 210 (or at least at its completion), the first roof perimeter 304A can be projected into any other image (e.g., the right image 212). Any appropriate initial guess as to the appropriate height of the first roof perimeter 304A can be used (e.g., height from a DTM, DSM, or other source).

Figure 3C:
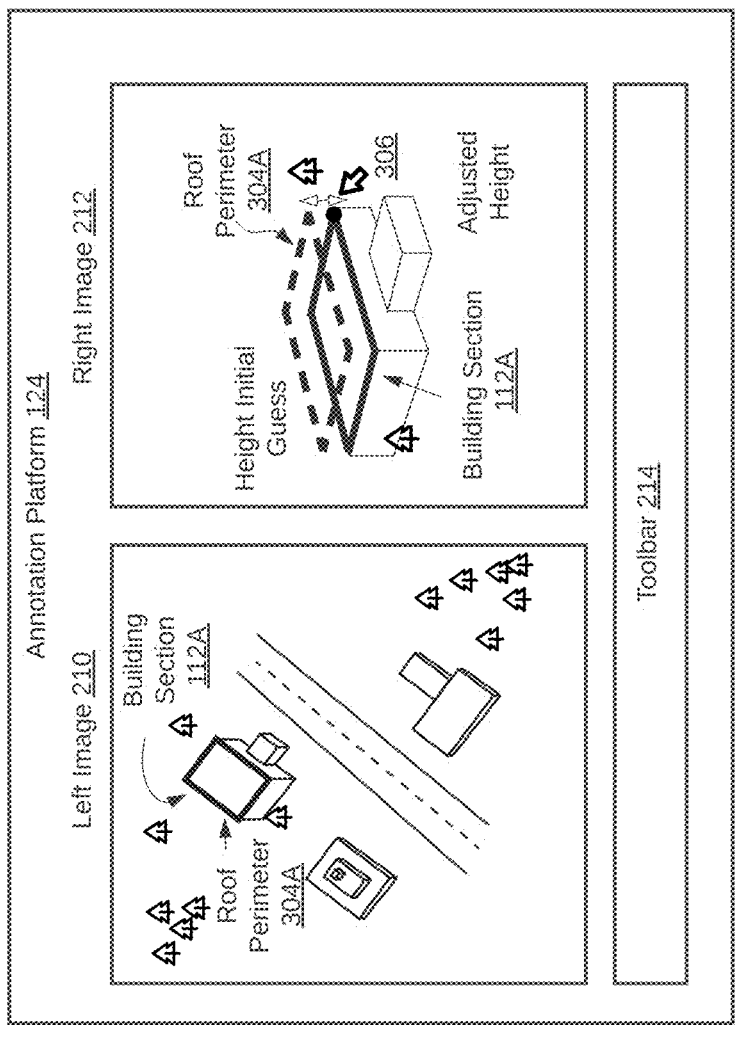

Next, referring to FIG. 3C and step 406 of FIG. 4, the annotation platform 124 provides functionality for the user to adjust the height of the first roof perimeter 304A to improve the accuracy of the initial guess. The user may engage a "height adjustment tool" (e.g., by selecting the tool from the toolbar 214 or by executing the appropriate keyboard inputs) and proceed to adjust the height of the first roof perimeter 304A with reference to one or more additional images made available by the annotation platform 124. As shown in FIG. 3C, the user uses the cursor 306 to click and drag the projection of the first roof perimeter 304A in the right image 212 to the correct height. While adjusting the height, the annotation platform 124 may fix the first roof perimeter 304A with respect to the left image 210. In other words, the annotation platform 124 may constrain the first roof perimeter 304A to slide along an epipolar line of the left image 210 (in practice, an "average" epipolar line passing through the center of the perimeter polygon may be used). Therefore, the position of the first roof perimeter 304A may remain unchanged as viewed from the left image 210. The height-adjusted first roof perimeter 304A defines the outline of the roof of the first building section 112A of the building 112 (which may contain additional building sections).

Figure 3D:
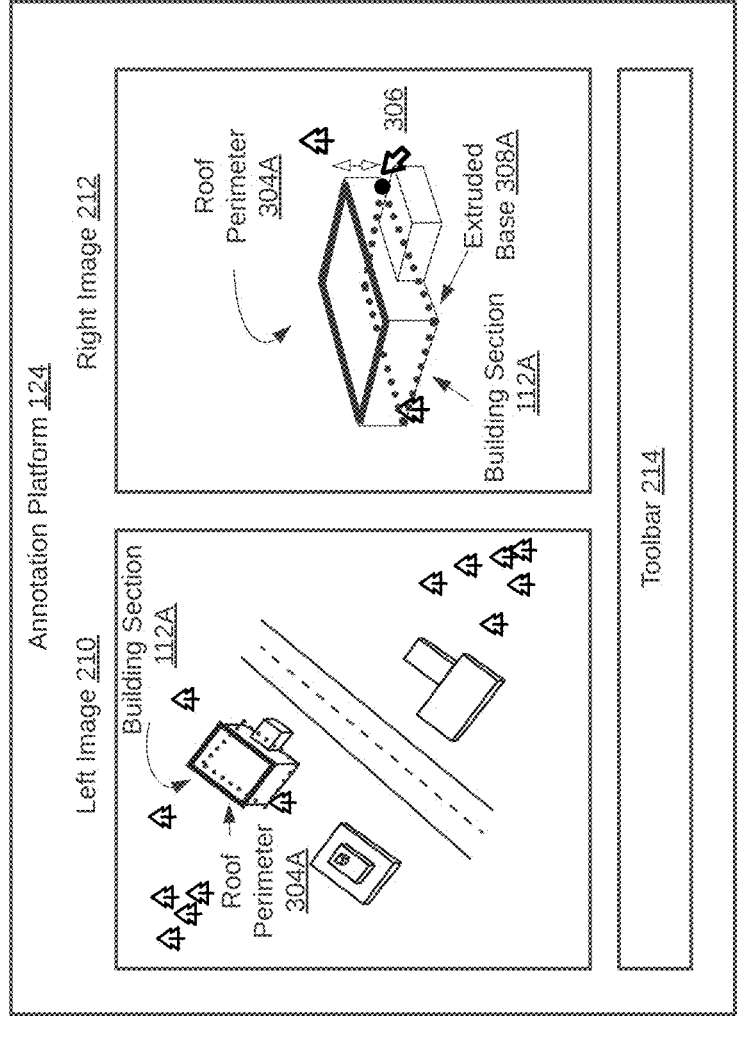

Next, referring to FIG. 3D and step 408 of FIG. 4, the annotation platform 124 provides functionality for the user to extrude the first roof perimeter 304A to the ground level to define the base and height of the first building section 112A. The user may engage an "extrusion tool" (e.g., by selecting the tool from the toolbar 214 or by executing the appropriate keyboard inputs) and proceed to extrude the base of the first building section 112A from the first roof perimeter 304A with reference to any of the images made available by the annotation platform 124. As shown in FIG. 3D, the user uses the cursor 306 to click and drag the first roof perimeter 304A downward toward the ground until the first extruded base 308A appears to be aligned with the base of the building 112. As a result of this extrusion action, a full three-dimensional geometric model of the first building section 112A is formed, including first roof perimeter 304A, first extruded base 308A, and the connecting walls, which have a height that is proportional to the distance between the first roof perimeter 304A and the first extruded base 308A.

While the user is extruding the first extruded base 308A from the first roof perimeter 304A, the annotation platform 124 may fix the XY position of the first extruded base 308A to be vertically aligned with the first roof perimeter 304A. In other words, the annotation platform 124 may constrain the first extruded base 308A to be extruded along the "vertical" or Z axis, thereby breaking the epipolar constraint between the left image 210 and right image 212. Therefore, the first extruded base 308A is visible in both the left image 210 and the right image 212.

Figure 3E:
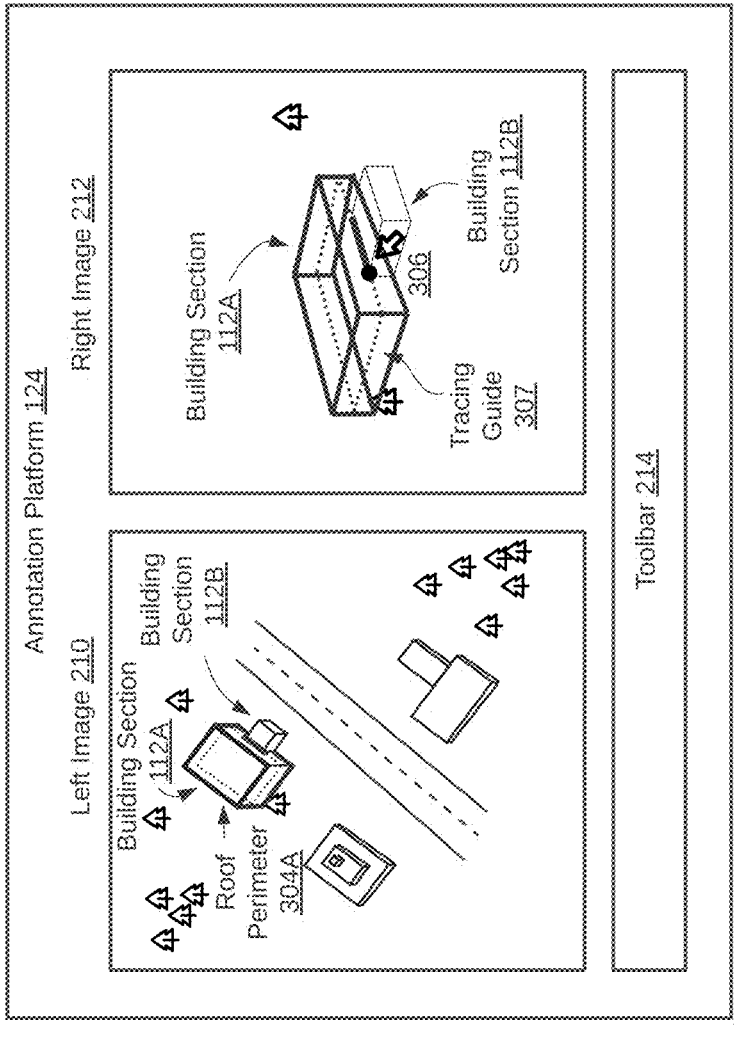

Next, referring to FIG. 3E and step 410 of FIG. 4, the annotation platform 124 provides functionality for the user to define one or more additional building sections that are adjacent to the first building section 112A, such as the second building section 112B. For comparison, it should be noted that a conventional approach to annotating an adjacent building section may involve simply annotating a new roof section and extruding it to the ground as described above. However, such an unconstrained approach may result in an undesired gap between the two supposedly adjacent building sections and/or an undesired difference in the ground level elevation of the base of each building section. As an alternative, the annotation platform 124 may provide a way for the user to leverage the previously-defined geometric model of the first building section 112A for a more accurate definition of the second building section 112B as being precisely adjacent to it. Thus, the user may engage a "tracing tool" (e.g., by selecting the tool from the toolbar 214 or by executing the appropriate keyboard inputs) and proceed to annotate the roof of the second building section 112B in a way that "branches off" or "extends off" the geometric model of the first building section 112A. As shown in FIG. 3E, the user uses the cursor 306 to trace along a wall of the first building section 112A to define a first edge of a new roof section for the second building section 112B. The user traces the new roof section at the appropriate height where the new roof section meets/abuts the first building section 112A (corresponding to the height of the second building section 112B). To assist the user at selecting the appropriate height along the wall, the annotation platform 124 may display a tracing guide 307 that indicates the height being traced. As shown in FIG. 3E, the tracing guide 307 may take the form of a horizontal line (horizontal to the XY or ground plane) wrapping around the first building section 112A at the selected height (or at least along a portion of the wall that is being traced). The tracing guide 307 may persist so long as the user is tracing along any of the walls of the first building section 112A.

Figure 3F:
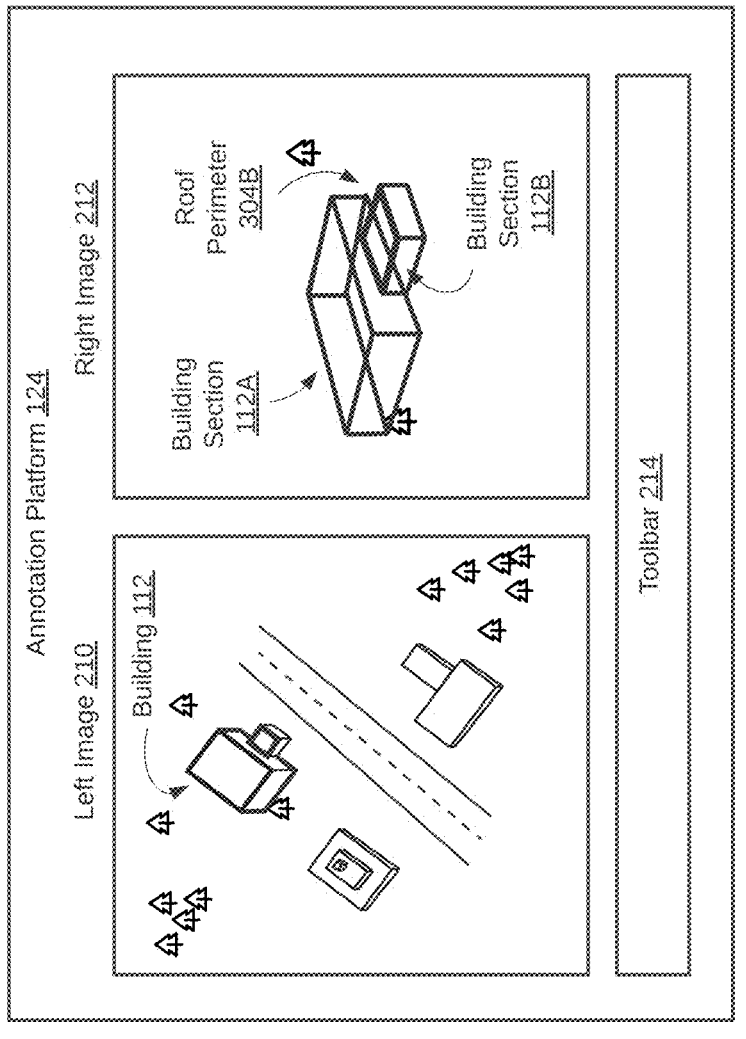

The traced edge of the new roof section for the second building section 112B provides an accurate and reliable starting point that is already defined in three-dimensional space as being coincident with the adjacent first building section 112A. Turning to FIG. 3F, the remainder of the new roof section for the second building section 112B can be completed including additional edges that branch off from the first building section 112A (now indicated as second roof perimeter 304B). Since the height value for the second building section 112B can be derived from the first building section 112A, there is no need for any height adjustment step. Further, in some cases, the base of the second building section 112B can be derived from the base of the first building section 112A as well. That is, the base of the second building section 112B can be automatically extruded to the same ground level as the first building section 112A, also alleviating the need for an additional extrusion step. However, this implies a shared common footprint, which may not be applicable for all buildings (e.g., where the ground level elevation shifts among different sections of the building). Thus, in other cases, the automatic extrusion option can be switched off, and the user may be allowed to independently extrude a base for the second building section 112B.

Additional adjacent building sections (not shown) can be annotated in a similar fashion as described above, branching and/or tracing off the previously defined building sections where appropriate. As a general approach, for buildings comprising several adjacent building sections, the tallest and/or most central building section should be annotated first, followed by the next tallest and/or most central building section, working outward, so that the lower building sections can be traced off the taller building sections whenever possible.

Figures 5A, 5B, 5C:
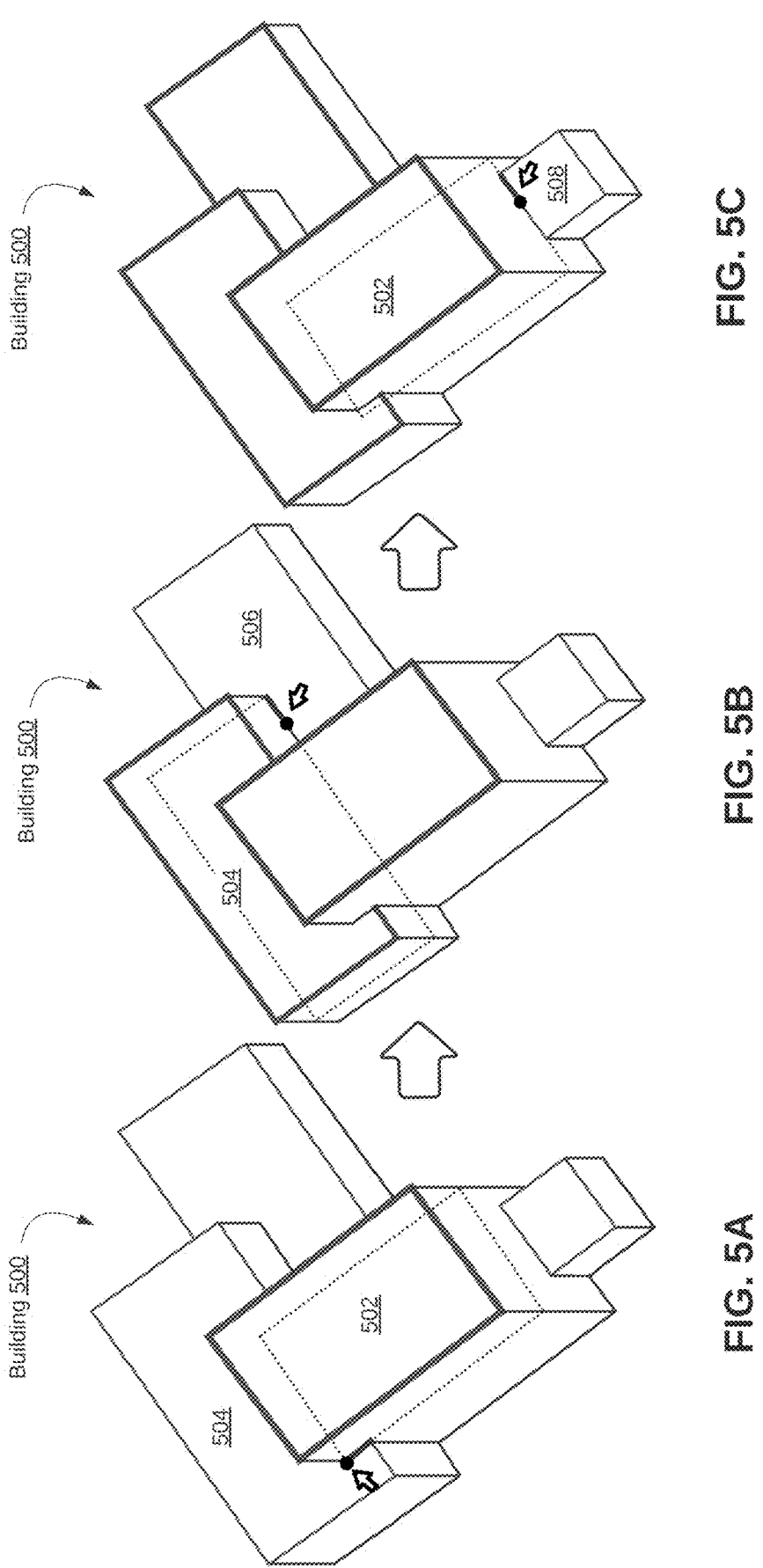
FIGS. 5A-5C depict an example building comprising several adjacent building sections undergoing various stages of annotation.

An example of this general approach is depicted in FIGS. 5A-5C. FIGS. 5A-5C depict a building 500 comprising several building sections 502, 504, 506, and 508, of different heights that are adjacent to one another. Following the approach described above, a user may begin annotating the building 500 by first annotating the building section 502, the most central and tallest building section (i.e., by drawing the roof outline and extruding to ground). As shown in FIG. 5A, the user may then trace a portion of the building section 502 to annotate the adjacent building section 504, the next tallest building section. Similarly, as shown in FIG. 5B, the user may then trace a portion of the building section 504 to annotate the adjacent building section 506, the next tallest building section. Similarly, as shown in FIG. 5C, the user may then trace another portion of the building section 502, and a portion of the building section 504, to annotate the final building section 508, the least tall building section. In this manner, the user has the greatest opportunity to leverage previously defined building sections to more accurately annotate additional building sections.

It should be noted at this stage that the teachings described herein may be applicable not only to generating geometric models of individual buildings comprising multiple adjacent building sections, but also, may be applied to generating geometric models of multiple distinct buildings that are adjacent to one another. For example, suppose that the building sections 502, 504, 506, 508 comprising the building 500 depicted in FIGS. 5A-5C is in fact several distinct buildings occupying distinct legal land parcels, such as in the context of residential townhouses or other buildings in dense urban environments. In such a case, a user may be tasked with annotating, for example, the building section 506 (representing a distinct building occupying a distinct legal land parcel), in part by tracing around the previously-defined building sections 502 and 504 (each representing distinct buildings occupying distinct legal land parcels). Thus, generating a geometric model of a building may involve determining that a first building and an adjacent second building (previously defined) occupy distinct legal land parcels, designating that the previously-generated geometric model of the second building is distinct from the to-be-generated geometric model of the first building, and proceeding to annotate the first building at least in part by tracing a portion of the second building.

FIGS. 6A-6F are schematic diagrams depicting the functionality of various annotation tools for reconstructing three-dimensional building geometry that may be offered by the annotation platform 124. These tools include some of those already described, which are summarized in general terms again below, including the "extrusion tool" and the "tracing tool". These tools also include other commonly employed tools for annotating flat roof geometry such as the "parallel line tool", the "rectangle tool", the "trace adjustment tool", and the "repair tool".

Figure 6C:
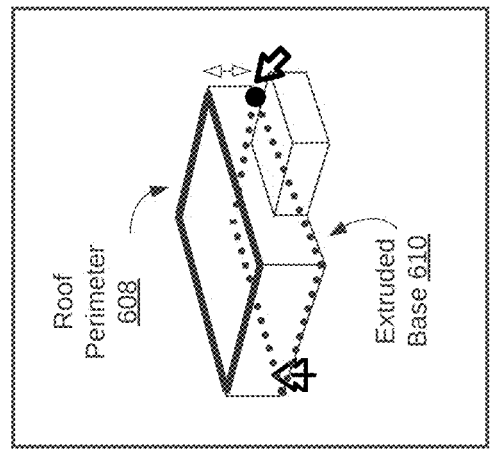
FIGS. 6A-6F are schematic diagrams depicting the functionality of various annotation tools for reconstructing three-dimensional building geometry.
Figure 6F:
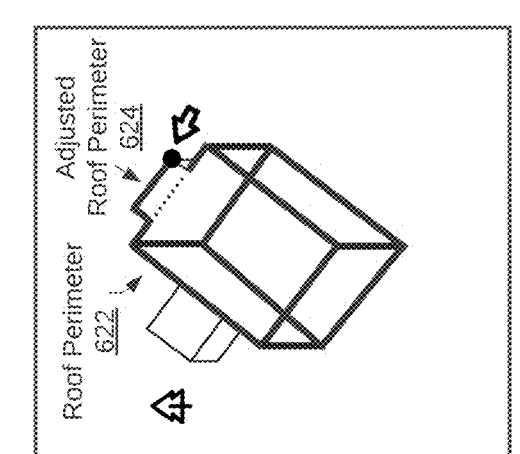
Figure 6B:
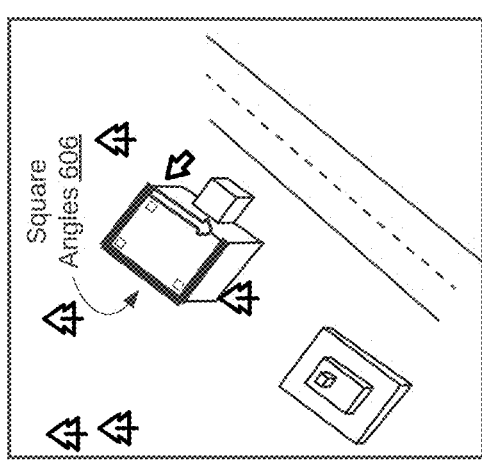
Figure 6E:
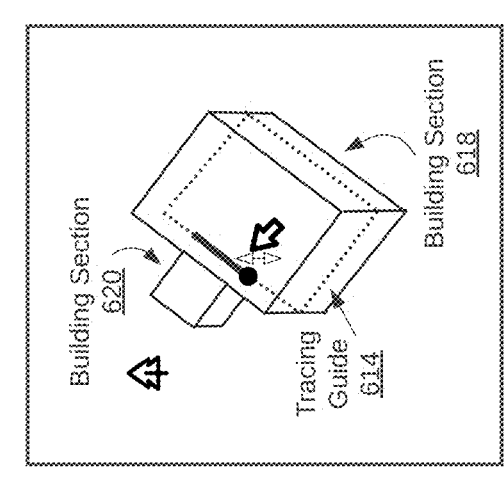
Figure 6A:
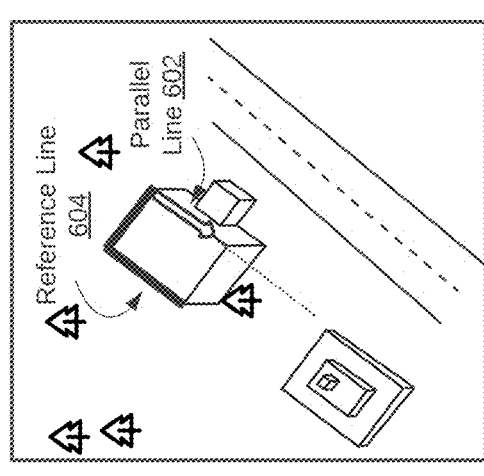
Figure 6A:

In FIG. 6A, a user is shown employing a parallel line tool. The parallel line tool may be provided through the annotation platform 124 as a means for a user to define, during annotation of a linear roof element (e.g., an edge of the roof), that the linear roof element is to be parallel to a reference linear roof element (e.g., another edge of the roof). A user may access the parallel line tool by selecting the appropriate tool through the toolbar 214 or by engaging the appropriate keyboard and/or mouse inputs. A user may employ the parallel line tool in the following way: (i) the user beings annotating a new (e.g., parallel line 602) line by indicating the starting point of the new line, (ii) before indicating the endpoint of the new line, the user engages the parallel line tool (e.g., by holding down a specific key on a keyboard), (iii) the user indicates a reference line (e.g., reference line 604) to which the new line is to be parallel, (iv) the annotation platform constrains the definition of the endpoint of the new line to be along a line that is parallel to the reference line, and (v) the user completes annotation of the new line by indicating its end point within the constraint.

The parallel line tool may be particularly useful for defining roof elements that can reasonably be expected to be parallel to one another in the real world, such as opposite sides of the roof.

In FIG. 6B, a user is shown employing a rectangle tool. The rectangle tool may be provided through the annotation platform 124 as a means for a user to define, for a following sequence of linear roof elements, that each of the linear roof elements are to be parallel or perpendicular to one another. A user may access the rectangle tool by selecting the appropriate tool through the toolbar 214 or by engaging the appropriate keyboard and/or mouse inputs. A user may employ the rectangle tool in the following way: (i) the user annotates the first line in the sequence, (ii) the user engages the rectangle tool (e.g., by holding down a specific key on a keyboard), (iii) the annotation platform constrains the definition of the next lines in the sequence to be parallel or perpendicular to the previously-defined line, and (iv) the user continues annotating each line in the sequence until complete. Each line in the sequence is therefore joined to each adjacent line in the sequence by square angles (e.g., square angles 606). The rectangle tool may be particularly useful for defining a series of roof elements that can reasonably be expected to be parallel or perpendicular to one another in the real world. For example, a user may define each of the sides of the perimeter of a roof as being parallel or perpendicular to one another.

In FIG. 6C, a user is shown employing an extrusion tool. This extrusion tool refers to the extrusion tool demonstrated in FIG. 3D and referenced in step 410 of the method 400 of FIG. 4. The trace tool may be provided through the annotation platform 124 as a means for a user to extrude the roof of a building section to the ground to define the base of the building. A user may access the extrusion tool by selecting the appropriate tool through the toolbar 214 or by engaging the appropriate keyboard and/or mouse inputs. A user may employ the extrusion tool in the following way: (i) having engaged the extrusion tool, the user clicks and drags the roof perimeter (e.g., roof perimeter 608) that is to be extruded down to the appropriate ground-level elevation, and (ii) the user releases the roof perimeter to complete the definition of the extruded base (e.g., extruded base 610). The user may extrude the roof perimeter with reference to any of the available images provided by the annotation platform. The user may begin the extrusion process through one image and fine-tune the extrusion in another image.

Figure 6D:
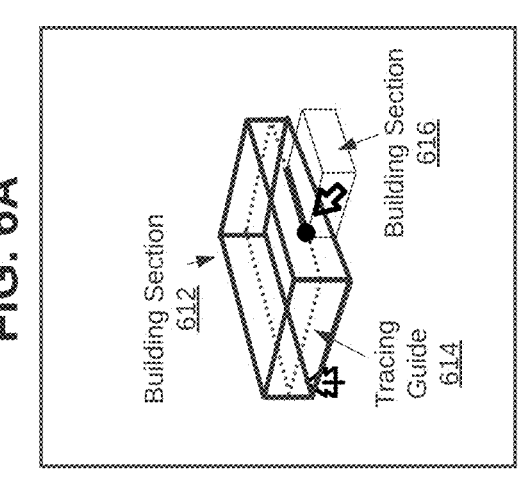

In FIG. 6D, a user is shown employing a tracing tool. This tracing tool refers to the tracing tool demonstrated in FIG. 3E and referenced in step 410 of the method 400 of FIG. 4. The trace tool may be provided through the annotation platform 124 as a means for a user to annotate the roof of a building section that abuts (i.e., is adjacent to) a wall of a previously defined building section. A user may access the trace tool by selecting the appropriate tool through the toolbar 214 or by engaging the appropriate keyboard and/or mouse inputs. A user may employ the trace tool in the following way: (i) having engaged the tracing tool, the user hovers over a wall of a previously defined building section with a cursor in the area where the roof of the new building section meets the previously defined building section (building section 612), (ii) the annotation platform displays as visual guide that indicates the height along the wall of the previously defined building section at the position targeted by the cursor (e.g., as shown in FIG. 5D, see tracing guide 614, as a set of horizontal dotted lines that are parallel to the XY or "ground" plane and which run through the walls of the first building section), (iii) the user selects the starting point of the roof of the second building section (e.g., building section 616), which the annotation platform interprets to be coincident with the selected point along the wall of the first building section, (iv) the user proceeds to trace along the wall of the first building section along the fixed height, including tracing around other adjacent walls around the first building section, if appropriate, and (v) when the roof of the second building section departs from the first building section, the user proceeds to annotate the remainder of the roof of the second building section using the appropriate annotation tools.

In FIG. 6E, a user is shown employing a trace adjustment tool. This trace adjustment tool may be used in conjunction with the tracing tool demonstrated in FIG. 3E and FIG. 6D and referenced in step 410 of the method 400 of FIG. 4, with the following differences. The trace adjustment tool may be provided through the annotation platform 124 to allow a user to adjust the height of a previously-traced roof line by clicking through a geometric model that is occluding the area being worked on. The trace adjustment tool may be particularly useful for adjusting the height of a wall of a building section when the wall that is being worked on is occluded from a particular point of view. A user may access the trace adjustment tool by selecting the appropriate tool through the toolbar 214 or by engaging the appropriate keyboard and/or mouse inputs. A user may employ the trace adjustment tool in the following way: (i) having engaged the trace adjustment tool, the user selects a roof line that was traced against a wall of an existing building section (e.g., building section 618), (ii) the user drags the traced line up or down to adjust the height of the new building section (e.g., building section 620), and (iii) the user releases the traced line to complete adjustment of the height of the building section. As the traced line is moved, the new height is reflected in the tracing guide (e.g., tracing guide 614). By engaging the trace adjustment tool, the annotation platform 124 can distinguish the actions of the user from other actions that would affect the geometric model that is occluding the area being worked on (e.g., to distinguish from adjusting the occluding geometric model itself).

In FIG. 6F, a user is shown employing a roof perimeter repair tool. The roof perimeter repair tool may be provided through the annotation platform 124 as a means for a user to adjust the geometry of a previously defined roof perimeter. The roof perimeter repair tool may be particularly useful for adjusting a roof perimeter that may have been generated (imperfectly) by an automated process. A user may access the roof perimeter repair tool by selecting the appropriate tool through the toolbar 214 or by engaging the appropriate keyboard and/or mouse inputs. A user may employ the roof perimeter repair tool in the following way: (i) having engaged the roof perimeter repair tool, the user selects a point along the edge of a previously defined roof perimeter (e.g., roof perimeter 622), (ii) the user drags the point to a new location that more precisely reflects the geometry of the roof (adjusted roof perimeter 624), and (iii) the user releases the point to complete the adjustment of the moved point. The user may select and adjust several points of the roof perimeter in this way. Once complete, any changes made to the roof perimeter geometry may be carried through to the extruded base of the roof to maintain the prismatic shape of the building section.

Thus, the present disclosure therefore provides systems and methods for generating geometric models of multi-floor buildings. In particular, an annotation platform may be used with the various annotation tools and procedures described herein, to reconstruct 3D building structure, such as the structure of a building with multiple roof sections at different heights.

It is further contemplated that the flat-roof models generated as described herein may be further augmented with additional detail using other annotation tools. For example, a multi-floor building model generated herein may be augmented with complex roof geometry as described in U.S. patent application Ser. No. 18/402,239, entitled ANNOTATION TOOLS FOR RECONSTRUCTING THREE-DIMENSIONAL ROOF GEOMETRY, filed Jan. 2, 2024, the entirety of which is hereby incorporated by reference, using the multi-floor building models as a base layer on which more complex roof geometry can be built.

As mentioned above, the annotation platform and its tools described herein may be used to generate geometric models of buildings directly from source imagery. Alternatively, the annotation platform and tools may be used to edit previously-generated geometric models of buildings for quality assurance purposes. Such previously-generated geometric models may have been generated by an automated process. For example, a multi-floor building model generated herein may have been generated from multiview imagery according to the process described in U.S. patent application Ser. No. 18/319,553, entitled VECTOR DATA PROJECTION AND FEATURE MATCHING TO DETERMINE THREE-DIMENSIONAL STRUCTURE, filed May 18, 2023, the entirety of which is hereby incorporated by reference.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method for generating a geometric model of a building from multiview imagery, wherein the building comprises at least a first building section covered by a first substantially horizontal roof structure situated at a first height and a second building section adjacent to the first building section and covered by a second substantially horizontal roof structure situated at a second height lower than the first height, wherein the method comprises:

displaying, through an annotation platform, at least a first image and a second image that depict the building from different points of view;

providing, through the annotation platform, functionality for a user to annotate, with reference to at least the first image and the second image, a three-dimensional structure of the first building section, by (i) annotating a first perimeter, situated at the first height, of the first substantially horizontal roof structure, and (ii) extruding the first perimeter to a ground level to thereby form side walls of the first building section;

providing, through the annotation platform, functionality for a user to annotate a three-dimensional structure of the second building section, by (i) annotating a point, situated at the second height, located directly on one of the side walls of the first building section, to begin a second perimeter of the second substantially horizontal roof structure, (ii) annotating a remainder of the second perimeter, and (iii) extruding the second perimeter to a ground level to thereby form side walls of the second building section;

accessing legal land parcel data for the building;

determining that the first building section and the second building section occupy distinct legal land parcels; and splitting the geometric model of the building into a first geometric model comprising the first building section and a second geometric model comprising the second building section.

2. The method of claim 1, wherein annotating the first perimeter of the first substantially horizontal roof structure comprises:

(i) annotating the first perimeter with reference to the first image, and (ii) adjusting a height of the first perimeter with reference to the second image to match the first height.

3. The method of claim 1, wherein annotating the remainder of the second perimeter comprises:

tracing directly on a same side wall as the first point at the second height to define at least part of one edge of the second perimeter.

4. The method of claim 1, wherein the annotation platform is configured to extrude the second perimeter to the same ground level to which the first perimeter was extruded.

5. The method of claim 1, further comprising:

providing, through the annotation platform, functionality for a user to define, during annotation of an edge of one of the perimeters, that the edge is to be parallel to a reference edge of one of the perimeters.

6. The method of claim 1, further comprising:

providing, through the annotation platform, functionality for a user to define, that each edge of a perimeter is to be parallel or perpendicular to each other edge.

7. The method of claim 1, wherein the first and second images comprise a stereoscopic pair.

8. The method of claim 1, wherein at least one of the first and second images comprises an oblique image.

9. The method of claim 1, wherein the method further comprises:

displaying, through the annotation platform, a building identification guide in at least one of the first and second images to assist a user of the annotation platform to locate the building for annotation, wherein the building identification guide comprises a two-dimensional building footprint of the building.

10. The method of claim 9, wherein the method further comprises, prior to displaying the first and second images through the annotation platform:

extracting the two-dimensional building footprint from one of the first image or the second image.

11. The method of claim 1, further comprising:

displaying, following the user annotating the point on one of the side walls of the first building section at the second height, a tracing guide that marks the second height along the side wall, to assist the user to trace along the side wall at the second height.

12. A system for generating a geometric model of a building from multiview imagery, wherein the building comprises at least a first building section covered by a first substantially horizontal roof structure situated at a first height and a second building section adjacent to the first building section and covered by a second substantially horizontal roof structure situated at a second height lower than the first height, wherein the system comprises one or more computing devices configured to:

display, through an annotation platform, at least a first image and a second image that depict the building from different points of view;

provide, through the annotation platform, functionality for a user to annotate, with reference to at least the first image and the second image, a three-dimensional structure of the first building section, by (i) annotating a first perimeter, situated at the first height, of the first substantially horizontal roof structure, and (ii) extruding the first perimeter to a ground level to thereby form side walls of the first building section;

provide, through the annotation platform, functionality for a user to annotate a three-dimensional structure of the second building section, by (i) annotating a point, situated at the second height, located directly on one of the side walls of the first building section, to begin a second perimeter of the second substantially horizontal roof structure, (ii) annotating a remainder of the second perimeter, and (iii) extruding the second perimeter to a ground level to thereby form side walls of the second building section;

accessing legal land parcel data for the building;

determining that the first building section and the second building section occupy distinct legal land parcels; and splitting the geometric model of the building into a first geometric model comprising the first building section and a second geometric model comprising the second building section.

13. The system of claim 12, wherein the one or more computing devices are further configured to:

displaying, through the annotation platform, a building identification guide in at least one of the first and second images to assist a user of the annotation platform to locate the building for annotation, wherein the building identification guide comprises a two-dimensional building footprint of the building; and prior to displaying the first and second images through the annotation platform, extract the two-dimensional building footprint from one of the first image or the second image.

14. The system of claim 12, wherein the one or more computing devices are further configured to:

display, following the user annotating the point on one of the side walls of the first building section at the second height, a tracing guide that marks the second height along the side wall, to assist the user to trace along the side wall at the second height.

15. At least one non-transitory machine-readable storage medium comprising instructions that when executed cause one or more processors to:

display, through an annotation platform, at least a first image and a second image that depict a building from different points of view, wherein the building comprises at least a first building section covered by a first substantially horizontal roof structure situated at a first height and a second building section adjacent to the first building section and covered by a second substantially horizontal roof structure situated at a second height lower than the first height;

provide, through the annotation platform, functionality for a user to annotate, with reference to at least the first image and the second image, a three-dimensional structure of the first building section, by (i) annotating a first perimeter, situated at the first height, of the first substantially horizontal roof structure, and (ii) extruding the first perimeter to a ground level to thereby form side walls of the first building section;

provide, through the annotation platform, functionality for a user to annotate a three-dimensional structure of the second building section, by (i) annotating a point, situated at the second height, located directly on one of the side walls of the first building section, to begin a second perimeter of the second substantially horizontal roof structure, (ii) annotating a remainder of the second perimeter, and (iii) extruding the second perimeter to a ground level to thereby form side walls of the second building section accessing legal land parcel data for the building;

determining that the first building section and the second building section occupy distinct legal land parcels; and splitting the geometric model of the building into a first geometric model comprising the first building section and a second geometric model comprising the second building section.

16. The at least one non-transitory machine-readable storage medium of claim 15, wherein annotating the first perimeter of the first substantially horizontal roof structure comprises:

(i) annotating the first perimeter with reference to the first image, and (ii) adjusting a height of the first perimeter with reference to the second image to match the first height.

17. The at least one non-transitory machine-readable storage medium of claim 15, wherein the instructions when executed further cause the one or more processors to:

display, following the user annotating the point on one of the side walls of the first building section at the second height, a tracing guide that marks the second height along the side wall, to assist the user to trace along the side wall at the second height;

wherein annotating the remainder of the second perimeter comprises tracing, with reference to the tracing guide, directly on a same side wall as the point and situated at the second height, to define at least part of one edge of the second perimeter.

18. The at least one non-transitory machine-readable storage medium of claim 15, wherein the instructions when executed further cause the one or more processors to:

extrude the second perimeter to the same ground level to which the first perimeter was extruded.

* * * * *